United States Patent
Kurokawa et al.

(10) Patent No.: US 7,562,601 B2
(45) Date of Patent: Jul. 21, 2009

(54) WORM WHEEL AND ELECTRIC POWER STEERING SYSTEM

(75) Inventors: Takanori Kurokawa, Nara (JP); Hideo Matsubara, Nara (JP); Akihiko Shiina, Nara (JP)

(73) Assignee: Jtekt Corporation, Chuo-ku, Osaka (JP)

( * ) Notice: Subject to any disclaimer, the term of this patent is extended or adjusted under 35 U.S.C. 154(b) by 645 days.

(21) Appl. No.: 11/175,052

(22) Filed: Jul. 6, 2005

(65) Prior Publication Data

US 2006/0005652 A1    Jan. 12, 2006

(30) Foreign Application Priority Data

Jul. 7, 2004    (JP)    ............ P 2004-200951

(51) Int. Cl.
*F16H 1/16*    (2006.01)
*B62D 5/04*    (2006.01)

(52) U.S. Cl. ............ 74/446; 74/388 PS; 74/425; 74/DIG. 10

(58) Field of Classification Search .......... 74/388 PS, 74/425, 446, DIG. 10
See application file for complete search history.

(56) References Cited

U.S. PATENT DOCUMENTS 6,058,794 A * 5/2000 Hempel .............. 74/439
2001/0039730 A1    11/2001 Fujita et al.
2002/0020578 A1    2/2002 Kurokawa et al.

FOREIGN PATENT DOCUMENTS

| DE | 101 27 224 A 1 | 12/2002 |
| EP | 1 207 095 A2 | 10/2001 |
| JP | 11-192955 | 7/1999 |
| JP | 11-301501 | 11/1999 |
| JP | 2001-206230 | 7/2001 |
| JP | 2004-34941 | * 2/2004 |
| JP | 2004-034941 | 2/2004 |
| JP | 2004-345573 | 12/2004 |

OTHER PUBLICATIONS

European Search Report dated Oct. 18, 2005.

* cited by examiner

*Primary Examiner*—William C Joyce
(74) *Attorney, Agent, or Firm*—McGinn IP Law Group, PLLC

(57) ABSTRACT

A worm wheel includes an annular metallic core portion and a resin rim portion which is fitted on an outer circumference of the core portion. The rim portion includes an annular main body portion which covers the outer circumference of the core portion and in which a toothed portion is formed on an outer circumference thereof and a pair of annular flanges which are made to extend from the main body portion in a radially inward direction X to thereby cover, respectively, outer edge portions of first and second sides of the core portion. The first annular flange 53 engages with a recess formed in the corresponding side of the core portion. A bottom portion of the recess includes an undercut portion in relation to a radially outward direction.

19 Claims, 5 Drawing Sheets

WORM WHEEL AND ELECTRIC POWER STEERING SYSTEM

BACKGROUND OF THE INVENTION

The present invention relates to a worm wheel and an electric power steering system including the worm wheel.

A speed reduction gear is used in an automotive electric power-steering system (EPS). For example, in a column-type EPS, the rotational force of a motor is transmitted to a worm and then to a worm wheel, whereby the rotational speed of the motor is reduced so as to amplify the output of the motor to thereby assist with torque for steering operation.

Incidentally, while an appropriate backlash is necessary for mesh engagement between the worm and the worm wheel, when driven on, for example, a rough road such as a road paved with stones or bricks, a beating sound attributed to the backlash may be generated by virtue of reaction from tires, or a rattling sound may be generated from bearings and other components having plays. When these sounds are transmitted into the passenger compartment as noises, the driver is rendered uncomfortableness.

Then, to cope with this, a worm wheel is normally used which includes an annular metallic core portion and a rim portion made of a resin which is fitted on an outer circumference of the core portion and in which a toothed portion is formed on an outer circumference of the rim portion (refer to, for example, JP-A-11-301501).

In recent years, however, there exists a demand for higher outputs from electric power steering systems, and due to this, the connecting strength between the core portion and the rim portion is desired to be ensured also under a high-temperature environment.

SUMMARY OF THE INVENTION

Then, a problem that the invention is to solve is how to provide a worm wheel which has a superior durability and an electric power steering system which includes the worm wheel.

In order to solve the aforesaid object, the invention is characterized by having the following arrangement.

(1) A worm wheel comprising:
   an annular metallic core portion; and
   an annular rim portion comprising a resin which is molded with the core portion inserted thereinto,
   wherein the core portion includes an undercut portion formed in a radially outer portion of at least one of a pair of side surfaces of the core portion,
   wherein the rim portion includes a main body portion which covers an outer circumference of the core portion and in which a toothed portion is formed on an outer circumference thereof and a pair of annular flanges which extend radially inwards from the main body portion so as to cover outer edge portions of the pair of side surfaces of the core portion, respectively, and
   wherein at least one of the pair of annular flanges is engaged with the undercut portion.

(2) The worm wheel according to (1), wherein the at least one of the pair of annular flanges is fitted in an annular recess formed in the outer edge portion of the side surface of the core portion, and the undercut portion is formed in a bottom portion of the annular recess.

According to the invention, since the radially outward movement of the core portion can be prevented by the annular flange of the rim portion, the connecting strength between the rim portion and the core portion is increased remarkably. As a result, even in the event that the worm wheel is used under the environment of high temperature and high load, it becomes possible to ensure a high durability. When used herein, the "undercut portion in relation to the radially outward direction" means a planar element which is not open (not visible) as viewed from the radially outward direction.

Further, according to the invention, the connecting strength between the rim portion and the core portion can be increased further. In particular, a risk that the annular flange rides on the outer circumference of the core portion can be eliminated in an ensured fashion.

With an electric power steering system for assisting in steering by transmitting power of an electric motor to a steering mechanism via a transmission gear which incorporates the worm wheel according to the invention, even in the event that the output of the electric power steering system is increased, the electric power steering system can still provide the superior durability.

DETAILED DESCRIPTION OF PREFERRED EMBODIMENTS

Referring to the accompanying drawings, a preferred embodiment of the invention will be described.

Figure 1:
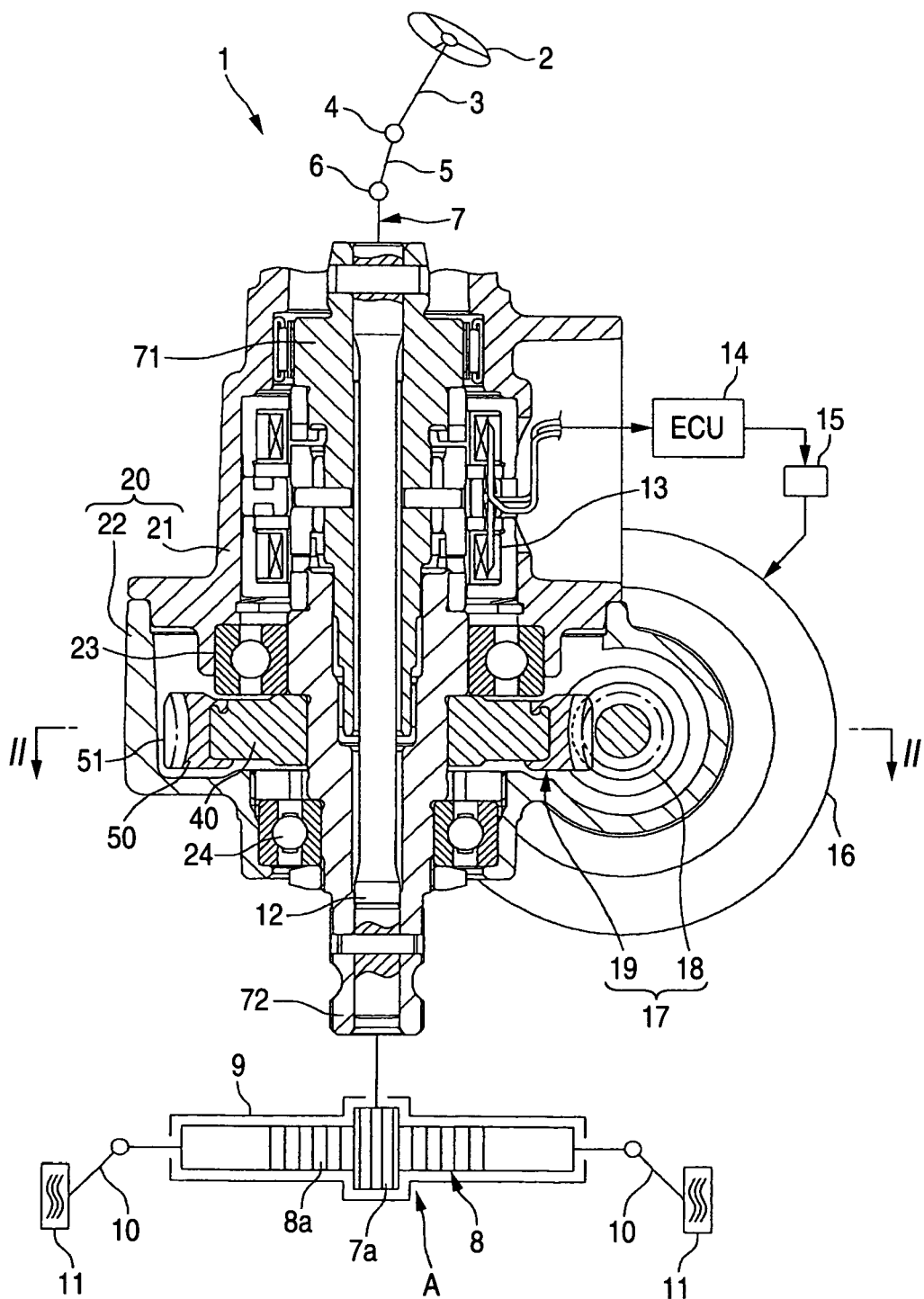
FIG. 1 is a sectional view which exemplifies an electric power steering system which utilizes a worm wheel according to an embodiment of the invention.

FIG. 1 is a sectional view which exemplifies an electric power steering system according to an embodiment of the invention. Referring to FIG. 1, the electric power steering system 1 comprises a steering shaft 3 connected to a steering member 2 such as a steering wheel or the like, an intermediate shaft 5 connected to the steering shaft 3 via a universal joint 4, a pinion shaft 7 connected to the intermediate shaft 5 via a universal joint 6, and a rack bar 8 as a steering rack which has rack teeth 8a which mesh with pinion gear teeth 7a provided in the vicinity of an end portion of the pinion shaft 7 and extends in a transverse direction of the automobile. A steering mechanism A made up of a rack and pinion mechanism is constituted by the pinion shaft 7 and the rack bar 8.

The rack bar 8 is supported in such a manner as to rectilinearly reciprocate via a plurality of bearings, not shown, within a housing 9 that is fixed to a vehicle body. End portions of the rack bar 8 protrude from ends of the housing 9, and tie rods 10 are joined to the end portions of the rack bar 8, respectively. The respective tie rods 10 are connected to corresponding wheels 11 via knuckles, not shown.

When the steering member 2 is operated, so that the steering shaft 3 is rotated, the rotation of the steering shaft 3 is converted into a rectilinear motion of the rack bar 8 along the transverse direction of the automobile by means of the pinion gear teeth 7a and the rack teeth 8a, whereby the turning of the wheels 11 is attained.

The pinion shaft 7 is divided into an upper shaft 71, which is on an input side and which continues to the steering member 2, and a lower shaft 72, which is on an output side and on which the pinion gear 7a is provided, and these upper and lower shafts 71, 72 are connected to each other via a torsion bar 12 in such a manner as to rotate relatively about the same axis.

A torque sensor 13 is provided which detects a steering torque through a relative rotational displacement amount between the upper shaft 71 and the lower shaft 72 via the torsion bar 12, and the results of detection of torque by the torque sensor 13 are given to an ECU (Electronic Control Unit) 14. In the ECU 14, an electric motor 16, which is adapted to assist in steering, is controlled to be driven via a driving circuit 15 based on the results of the torque detection and the results of detection of vehicle speed which are given by a vehicle speed sensor, not shown. A rotational output of the electric motor 16 is reduced in speed by a speed reduction gear 17, which functions as a transmission unit, and is then transmitted to the lower shaft 72 of the pinion shaft 7, where the rotational motion of the electric motor 16 is converted into a rectilinear motion of the rack bar 8, so that steering is assisted.

The speed reduction gear 17 includes a worm shaft 18, which is rotationally driven by the electric motor 16, and a worm wheel 19, which meshes with the worm shaft 18 and which is connected to the lower shaft 72 of the pinion shaft 7 in such a manner as to rotate together.

A housing 20, which accommodates therein the pinion shaft 7, includes a sensor housing 21 and a gear housing 22, which are fitted in and on each other. The lower shaft 72 of the pinion shaft 7 is supported rotatably by bearings 23, 24, which are arranged at both sides of the worm wheel 19 in such a manner as to face each other across the worm wheel 19. The bearing 23 is held to the sensor housing 21, whereas the bearing is held to the gear housing 22. The bearings 23, 24 are constituted by, for example, ball bearings.

Figure 2:
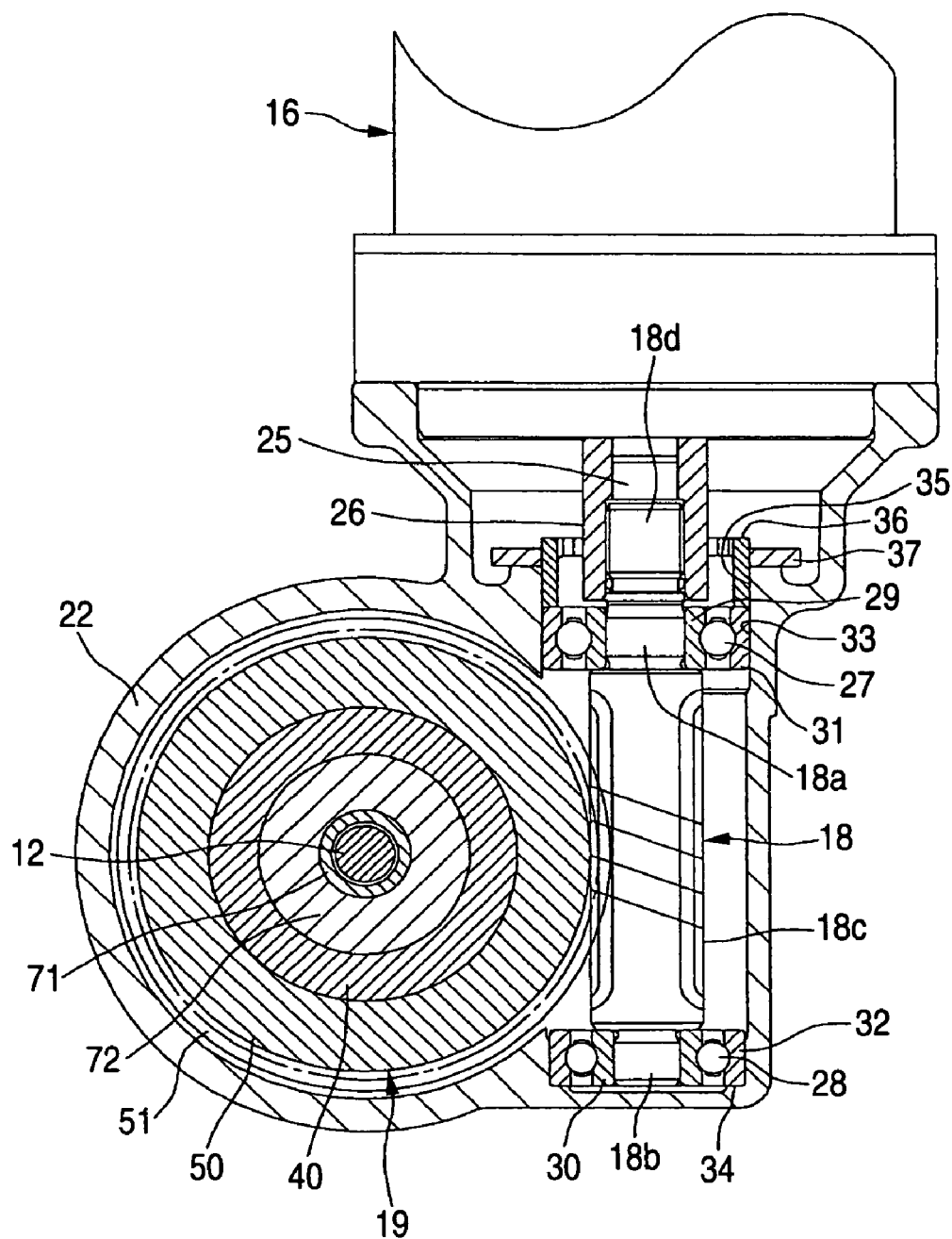
FIG. 2 is a sectional view taken along the line II-II in FIG. 1.

Referring to FIG. 2, the worm shaft 18 is disposed concentrically with an output shaft 25 of the electric motor 16. The worm shaft 18 has first and second end portions 18a, 18b, which are spaced apart in a longitudinal direction thereof, and also has a threaded or toothed portion 18c at an intermediate portion between the first and second end portions 18a, 18b.

A connecting portion 18b provided at the first end portion 18a of the worm shaft 18 and a corresponding end portion of the output shaft 25 of the electric motor 16 are coaxially connected to each other via a joint 26 which utilizes, for example, a serration fitting in such a manner as to transmit power from the electric motor 16.

The first and second end portions 18a, 18b of the worm shaft 18 are supported rotatably by the gear housing 22 via corresponding first and second bearings 27, 28, respectively. The first and second bearings 27, 28 are constituted by, for example, ball bearings.

Inner rings 29, 30 of the first and second bearings 27, 28 are fitted on the first and second end portions 18a, 18b, respectively, in such a manner as to rotate together. The inner rings 29, 30 are in abutment, respectively, with corresponding positioning stepped portions formed on the worm shaft 18 in such a manner as to face each other back to back. Outer rings 31, 32 of the first and second bearings 27, 28 are held to corresponding bearing holder holes 33, 34 in the gear housing 22 in such a manner as not to rotate.

A screw member 36 is screwed into a threaded hole 35 which continues to the bearing holder hole 33 in such a manner as to be brought into abutment with an end face of the outer ring 31 of the first bearing 27 to thereby position the first bearing 27 with respect to an axial direction of the worm shaft 18. The screw member 36 is fixed in place by a lock nut 37.

Referring to FIGS. 1 and 2, the worm wheel 19 is connected to an axially intermediate portion of the lower shaft 72 of the pinion shaft 7 in such a manner as to rotate together but not to move in an axial direction of the lower shaft 72. The worm wheel 19 includes an annular metallic core portion 40 which is connected to the lower shaft 72 in such a manner as to rotate together and an annular resin rim portion 50 having a toothed port-ion 51 which is fitted on an outer circumference of the core portion 40.

The rim portion 50 includes a synthetic resin which is injection molded together with part of the core portion 40 which is inserted into a mold. As synthetic resins that can be used for the rim portion 50, PPA (polyphenylene sulfide), PEEK (polyether ether ketone), PAI (polyamide-imide), POM (polyacetal), PBT (polybutylene terephthalate) and PET (polyethylene terephthalate) can be raised, in addition to polyamide such as PA6, PA66, PA46, PA11, PA12, PA6T, PA9T and PPA.

In addition, by using as a base resin any of the resins raised above or any combination thereof, a reinforcing fiber such as AF (Aramid fiber), GF (glass fiber) and CF (carbon fiber) may be filled, or a solid lubricant such as molybdenum disulfide, PTFE (polytetrafluoroethylene) and HDPE (high density polyethylene) may be mixed with the base.

Figure 3:
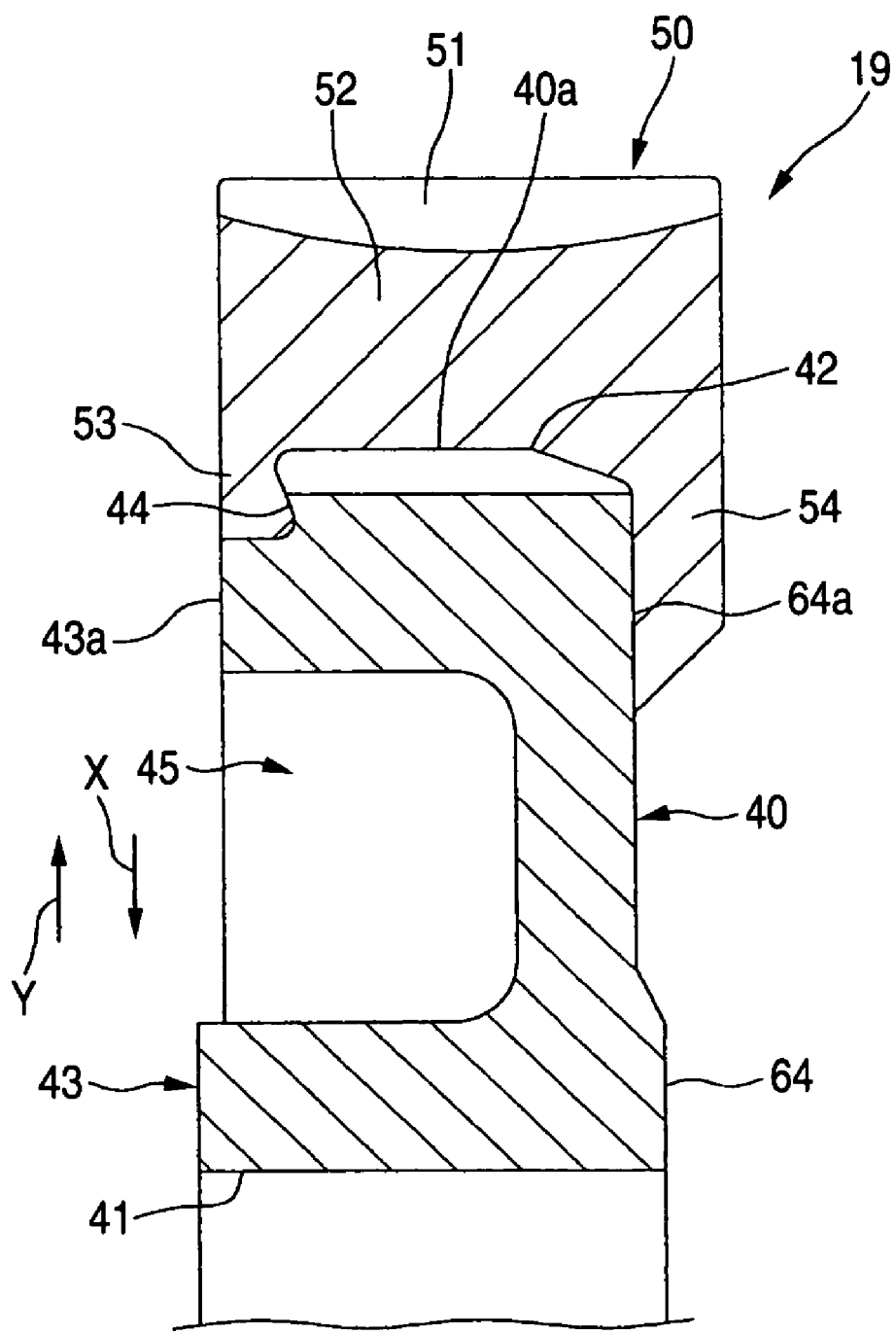
FIG. 3 is a sectional view of a main portion of the worm wheel.

Next, referring to FIG. 3, the core portion 40 includes as a center hole a fitting hole 41 through which the lower shaft 72 of the pinion shaft 7 is fittingly passed. In order to increase the joining force with the resin rim portion 50, for example, an involute spline 42 is formed on an outer circumference 40a of the core portion 40. The core portion 40 has first and second sides 43, 64, and an annular recess 44 is formed in an outer edge portion 43a of the first side 43. In addition, for example, an annular lightening hole 45 is provided in the first side 43 of the core portion 43.

The rim portion 50 includes a main body portion 52 which covers the outer circumference of the core portion and in which a toothed portion 51 is formed around an outer circumference thereof and first and second annular flanges 53, 54 which are made to extend from the main body portion 52 radially inwards so as to cover, respectively, the outer edge portions 43a, 64a of the first and second sides 43, 64 of the core portion 40.

Figure 4:
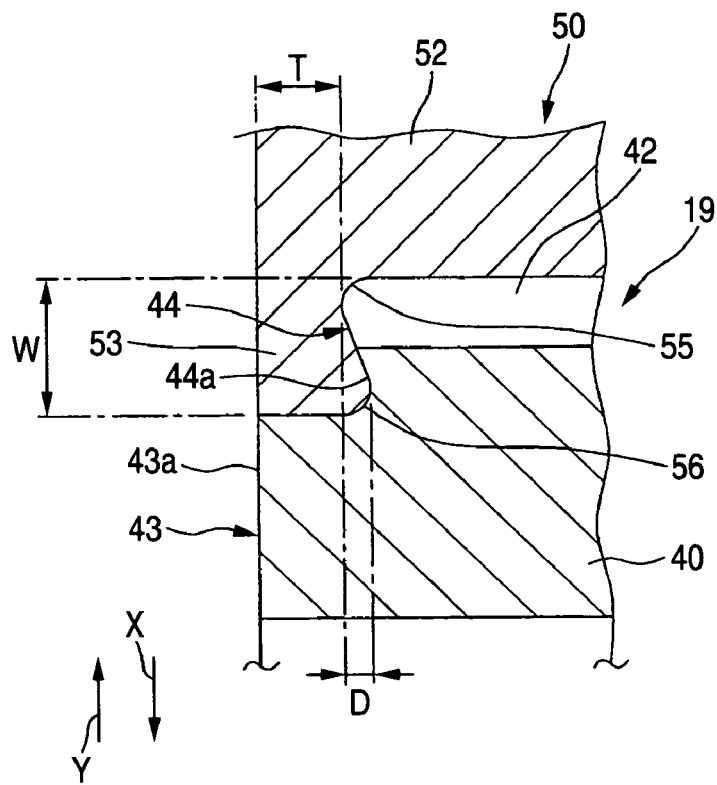
FIG. 4 is a partially enlarged view of FIG. 3.

Referring to FIG. 4, which is an enlarged view, the depth of the annular recess 44 in the core portion 40 is made to deepen as it extends further in a radially inward direction X. Namely, a bottom portion 44a of the recess 44 constitutes an undercut portion in relation to a radially outward direction Y, and the first annular flange 53 of the rim portion 50 is prevented from being dislocated from the core portion 40 in the radially outward direction Y by being brought into engagement with the bottom portion 44a functioning as the undercut portion. In this embodiment, while the bottom portion 44a of the recess 44 is formed into a conically tapered shape, the shape of the bottom portion 44a is not limited thereto, and hence the bottom portion 44a may be formed into a stepped shape. In addition, the undercut portion may be formed in part of the bottom portion 44a of the recess 44.

Here, the thickness T of the first annular flange 53 (which corresponds to the axial width of the rim portion 50) is preferably 1 mm or greater in consideration of the fluidity of molding resin at the time of molding.

In addition, the width W of the first annular flange 53 (which corresponds to the radial height of the rim portion 50) is preferably 2 mm or greater in consideration of the dislocation strength of the rim portion 50 from the core portion 40.

In addition, the undercut amount or depth D of the bottom portion 44a of the recess 44 is preferably 1 mm or greater in consideration of the engagement strength of the first annular flange 53 with the bottom portion 44a of the recess 44 (which corresponds to the peel strength of the resin).

In addition, the radius of curvature in section of an inside corner between a base of the first annular flange 53, which engages with the bottom portion 44a of the recess 44, and the main body portion 52 and the radius of curvature in section of a distal end edge 56 of the first annular flange 53 are preferably 0.5 mm or greater in an attempt to relax stress concentration to these portions.

According to the embodiment, since the first annular flange 53 of the rim portion 50 engages with the bottom portion 44a of the recess 44, which functions as the undercut portion, the first annular flange 53 can be prevented from being moved in the radially outward direction Y of the core portion 40. As a result, the connecting strength between the rim portion 50 and the core portion 40 can be increased remarkably, thereby making it possible to obtain the worm wheel 19 having the high strength and durability.

In particular, even in the event that the thermal expansion of the rim portion 50 becomes larger than that of the core portion 40 when the temperature is increased, it can be ensured that the movement of the first annular flange 53 in the radially outward direction Y of the core portion 40 is prevented by virtue of the function of the undercut portion. Consequently, the worm wheel 19 of the invention can bear sufficiently the use thereof even under the environment of high temperature and high load.

Since the worm wheel 19 can be strengthened highly, when attempting to transmit the same torque, the worm wheel 19 can be reduced in both size and weight by reducing the diameter thereof. In addition, the reduction ratio can be increased by reducing the gear module of the worm wheel 19, and hence this enables the reduction in output of the electric motor 16, leading to the reduction in cost.

In addition, since the first annular flange 53, which has the predetermined thickness T and width W, is made to fit on the annular recess 44 in the first side 43 of the core portion 40 in a concavity and convexity fitting, it can be ensured that the first annular flange 53 is prevented from riding over the core portion 40 to the outer circumference side thereof to thereby be dislocated from the core portion 40, whereby the connecting strength between the rim portion 50 and the core portion 40 can further be increased.

By applying the speed reduction gear 17 as a transmission unit which incorporates the worm wheel 19 of the invention to the electric power steering system 1, the output of the electric power steering system 1 can be increased to meet the demand while securing the durability of the worm wheel 19.

Figure 5:
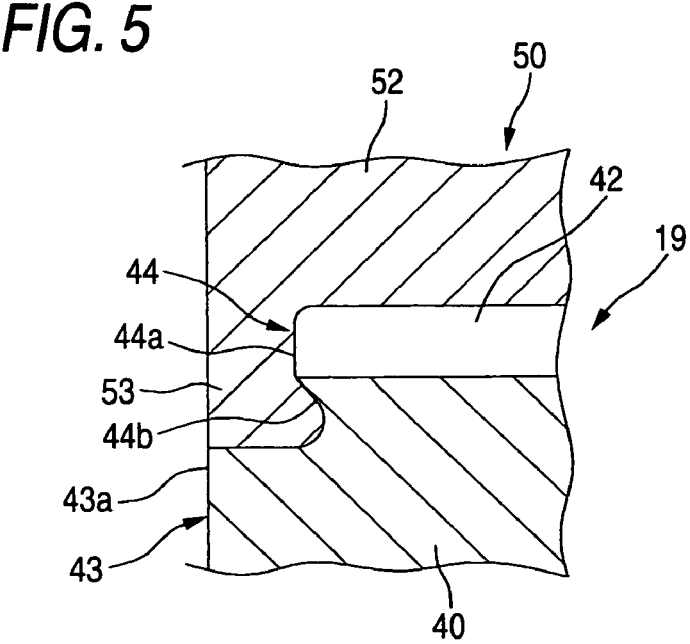
FIG. 5 is a sectional view of a main portion of a core portion of a worm wheel according to another embodiment of the invention.
Figure 6:
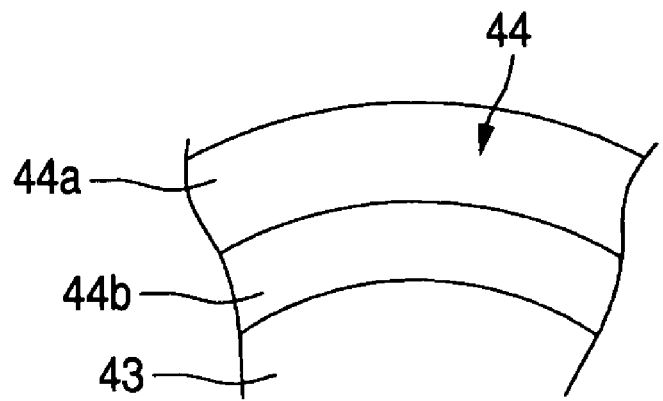
FIG. 6 is a side of the main portion of the core portion of the worm wheel according to the embodiment shown in FIG. 5.
Figure 7:
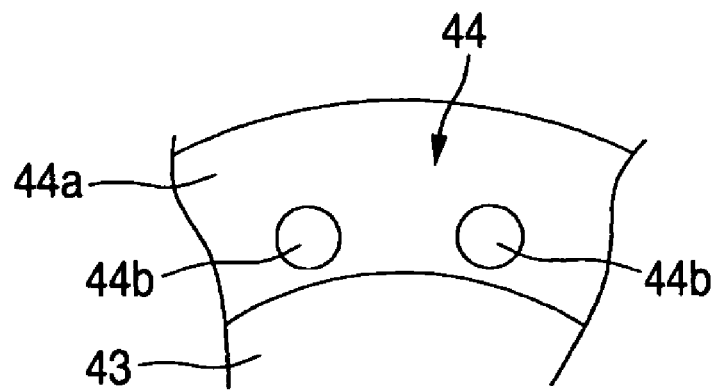
FIG. 7 is a side view of a main portion of a core portion of a worm wheel according to a further embodiment of the invention.

The invention is not limited to the embodiment that has been described heretofore, and hence, as shown in FIG. 5, the bottom portion 44a of the recess 44 in the outer edge portion 43a of the first side 43 of the core portion 40 may be partially deepened to constitute an undercut portion 44b. The undercut portion 44b so formed may be formed into an annular shape as shown in FIG. 6, or as shown in FIG. 7, in the bottom portion 44a of the recess 44, the undercut portion 44b may be provided one or in any plural number at a circumferential part on the first side 43.

In addition, an undercut portion may also be provided in the second side 64.

EXAMPLE

A worm wheel according to the embodiment was prepared which is identical in shape to the worm wheel shown in FIG. 3. PA66 was used for the rim portion, and the gear module was made to be 1.65 and 55 teeth were formed (the reduction ratio was made to be 18.33). In addition, referring to FIG. 4, the thickness T of the first annular flange 53 was made to be 2.8 mm, and the width W thereof was made to be 3.65 mm, the undercut amount D being made to be 1.33 mm.

On the other hand, a worm wheel was prepared as a comparison example which differs from the embodiment worm wheel only in that the bottom portion 44a of the recess 44 in FIG. 3 was made to have a perpendicular surface relative to the axis of the core portion 40 to thereby delete the undercut portion.

As a result of the measurement of the maximum transmissible torque (corresponding to the tooth root strength) of each of the embodiment and comparison example worm wheels under the environment of a high temperature of 100° C., the maximum transmissible torque of the comparison example worm wheel was 14 N·m, whereas that of the embodiment worm wheel was 24 N·m, and this verified that the strength was increased by about 70% in the worm wheel according to the invention.

What is claimed is:

1. A worm wheel comprising:
an annular metallic core portion; and
an annular rim portion comprising a resin which is molded with the core portion inserted thereinto,
wherein the core portion includes an undercut portion,
wherein the rim portion includes a main body portion which covers an outer circumference of the core portion and in which a toothed portion is formed on an outer circumference thereof and a pair of annular flanges which extend radially inwards from the main body portion so as to cover outer edge portions of the pair of side surfaces of the core portion, respectively, wherein at least one of the pair of annular flanges is engaged with the undercut portion,
wherein the undercut portion is formed at a corner disposed between a radially outer portion of at least one of the pair of side surfaces of the core portion and an outer circumference of the core portion opposed to the main body portion of the rim portion,
wherein a depth of the undercut portion of the core portion increases as it extends further in a radially inward direction, and
wherein an outer circumference of the core portion comprises an involute spline.

2. The worm wheel according to claim 1, wherein the at least one of the pair of annular flanges is fitted in an annular recess formed in the outer edge portion of the side surface of the core portion, and the undercut portion is formed in a bottom portion of the annular recess.

3. An electric power steering system for assisting in steering by transmitting power of an electric motor to a steering mechanism via a transmission gear which incorporates a worm wheel according to claim 2.

4. An electric power steering system for assisting in steering by transmitting power of an electric motor to a steering mechanism via a transmission gear which incorporates a worm wheel according to claim 1.

5. The worm wheel according to claim 1, wherein the pair of annular flanges and the main body portion form a recess and the undercut portion is formed in a part of the recess.

6. The worm wheel according to claim 5, wherein a cross-sectional area of the recess increases in a radially outward direction.

7. The worm wheel according to claim 5, wherein the undercut portion is formed in a radially inward part of the recess.

8. The worm wheel according to claim 5, wherein the undercut portion is not formed in a radially outward part of the recess.

9. The worm wheel according to claim 1, wherein the at least one of the pair of annular flanges engaged with the undercut portion has a thickness equal to or greater than about 1 mm in an axial direction.

10. The worm wheel according to claim 1, wherein the at least one of the pair of annular flanges engaged with the undercut portion has a width equal to or greater than about 2 mm in an axial direction.

11. The worm wheel according to claim 1, wherein a difference between a minimum thickness and a maximum thickness in an axial direction of the at least one of the pair of annular flanges engaged with the undercut portion is equal to or greater than about 1 mm.

12. The worm wheel according to claim 11, wherein the undercut portion comprises a concave portion having substantially the same radius of curvature as the axially inwardmost and radially inwardmost convex edge of the at least one of the pair of annular flanges engaged with the undercut portion.

13. The worm wheel according to claim 1, wherein an axially inwardmost and radially inwardmost convex edge of the at least one of the pair of annular flanges engaged with the undercut portion has a radius of curvature equal to or greater than about 0.5 mm.

14. The worm wheel according to claim 1, wherein an axially outermost and radially inwardmost concave edge of the at least one of the pair of annular flanges engaged with the undercut portion has a radius of curvature equal to or greater than about 0.5 mm.

15. The worm wheel according to claim 1, wherein an axially inwardmost and radially inwardmost convex edge of the at least one of the pair of annular flanges engaged with the undercut portion has a stepped shape.

16. The worm wheel according to claim 1, wherein the core portion and the rim portion have different rates of thermal expansion.

17. The worm wheel according to claim 1, wherein the at least one of the pair of annular flanges engages the undercut portion so as to prevent the rim portion from moving in a radially outward direction.

18. The worm wheel according to claim 1, wherein the at least one of the pair of annular flanges engages the undercut portion so as to prevent the rim portion from moving in a radially outward direction when the rim portion thermally expands at a higher rate than the core portion.

19. The worm wheel according to claim 1, wherein an axially inwardmost and radially inwardmost convex edge of the at least one of the pair of annular flanges engaged with the undercut portion has a conically-tapered shape.

* * * * *